United States Patent [19]
Raines et al.

[11] Patent Number: 5,462,756
[45] Date of Patent: Oct. 31, 1995

[54] COOK-IN MEAT PACKAGE

[75] Inventors: Charles D. Raines; Kenneth C. Hoffman, both of Columbus, Ga.

[73] Assignee: Plicon Corporation, Columbus, Ga.

[21] Appl. No.: 236,661

[22] Filed: Apr. 29, 1994

Related U.S. Application Data

[63] Continuation of Ser. No. 978,452, Nov. 18, 1992, abandoned, which is a continuation of Ser. No. 830,553, Feb. 3, 1992, abandoned, which is a continuation of Ser. No. 504,592, Apr. 5, 1990, abandoned.

[51] Int. Cl.$^6$ ............................ B65D 65/40; B65D 81/34
[52] U.S. Cl. ........................ 426/129; 426/127; 426/412; 426/415
[58] Field of Search ................................. 426/127, 129, 426/412, 415

[56] References Cited

U.S. PATENT DOCUMENTS

| | | | |
|---|---|---|---|
| 3,294,621 | 12/1966 | Baird, Jr. et al. | 426/129 |
| 3,587,839 | 6/1971 | Von Brecht | 426/412 |
| 3,625,348 | 12/1971 | Titchenal et al. | 426/412 |
| 3,900,635 | 8/1975 | Funderburk, Jr. et al. | 426/127 |
| 4,101,711 | 7/1978 | Stillman | 426/127 |
| 4,136,205 | 1/1979 | Quattlebaum | 426/129 |
| 4,267,960 | 5/1981 | Lind et al. | 426/129 |
| 4,382,513 | 5/1983 | Schirmer | 426/127 |
| 4,411,919 | 10/1983 | Thompson | 426/129 |
| 4,463,778 | 8/1984 | Judd et al. | |
| 4,606,922 | 8/1986 | Schirmer | 426/412 |
| 4,656,068 | 4/1987 | Raines | 428/515 |
| 4,784,863 | 11/1988 | Lustig et al. | |
| 4,801,486 | 1/1989 | Quacquarella et al. | 426/127 |
| 4,855,183 | 8/1989 | Oberle | 426/129 |
| 4,879,124 | 11/1989 | Oberle | 426/127 |
| 4,888,223 | 12/1989 | Sugimoto et al. | 426/129 |
| 5,047,725 | 3/1991 | Juhl et al. | |

FOREIGN PATENT DOCUMENTS

| | | | |
|---|---|---|---|
| 1078247 | 5/1980 | Canada | 426/127 |
| 2744713 | 4/1978 | Germany | 426/127 |

OTHER PUBLICATIONS

Packaging Digest Article Dated May 1982.

*Primary Examiner*—Steven Weinstein
*Attorney, Agent, or Firm*—Hill, Steadman & Simpson

[57] ABSTRACT

An improve heat-sealable cook-in package for meat products capable of providing excellent adherence with minimal purge loss comprised of interfacing sealable wall portions the interfacing layers of which consist of a high strength, high shrink, low melt index ethylene acid copolymer for adhering contact with the product and itself.

8 Claims, 1 Drawing Sheet

COOK-IN MEAT PACKAGE

This is a continuation of application Ser. No. 07/978,452, filed Nov. 18, 1992, now abandoned, which is a continuation of U.S. Ser. No. 07/830,553 filed Feb. 3, 1992, now abandoned, which is a continuation of Ser. No. 07/504,592 filed Apr. 5, 1990, now abandoned.

BACKGROUND OF THE INVENTION

1. Field of the Invention

This invention lies generally in the field of meat adherent, cook-in containers, particularly containers utilizing multi-layered formable packaging web structures.

2. Prior Art

The prior art teaches that a fill-conforming, heat-shrinkable meat-adherent plastic container comprised of hot blown olefinic polymer film, such as polyethylene, or ionomers of ethylene acid copolymers, can be used for cook-in of a meat or other highly proteinaceous product packaged therein with limited cook-out of fluids from the meat into the bag interior (see for examples, Thompson U.S. Pat. No. 4,411,919 and Baird, Jr. et al U.S. Pat. No. 3,294,621 and Packaging Digest of May 1982, pages 50–56). Packages for food have included ethylene acid copolymer film surfaces heat sealed to each other at portions of the package periphery. Such packages are shown in Raines U.S. Pat. No. 4,656,068. There, however, the package had at least one side constructed as a peelable seal with the ethylene acid copolymer contacting an unlike outer surface of polyethylene/ethylene vinyl acetate. Further, the package was not described as a cook-in package and in no way suggested any meat product cook-in capabilities for the ethylene acid copolymer or ethylene acid copolymer ionomer layer employed with polyethylene/ethylene vinyl acetate to provide the readily peelable package side seal. See also Stillman U.S. Pat. No. 4,101,711 showing a non-cook meat by having an ethylene acid copolymer layer adjacent the meat.

Cook-in prior art such as Thompson U.S. Pat. No. 4,411,919 or Packaging Digest, mentioned above, provide no basis for belief that a non-irradiated ethylene acid copolymer film in contact with meat product and sealed to itself would provide a superior cook-in performance with minimal purge and satisfactory seal, as has been found by applicants. Since in the packaged meat trade an appreciable (perhaps up to about 40 weight percent of the total fill) of water is conventionally compounded with the meat to be cooked in such a plastic container, the provision of plastic container structures which permit meat cook-in with substantially no purge presents a formidable technological problem. In effect, in a purge-free system of plastic container and meat (high protein) fill, the added water is taken up and retained by the meat tissue and does not exude or collect during or after cooking as a fluid (or juice) pocket located between the container wall and the fill. Unfortunately, such a pocket or fluid layer when present is typically readily visible to the consumer through such container wall which is typically a virtually transparent packaging material.

Purge avoidance in this field is achieved through the provision of plastic containers whose inner wall is characterized by an ability to adhere to the meat particularly during the cooking temperatures, which typically range from about 150° to 190° F. (More preferably from about 155° to 180° F.) As those familiar with fill formulations appreciate, it is sometimes possible to regulate adherency characteristics between a meat fill and a meat adhering container by compositional variations in the fill formulations. A close, face-to-face adjacent relationship between the container and the meat fill is achieved either by using a shape conforming container structure (such as a resilient casing) which can be literally stuffed with the meat, or by using a container structure which heat shrinks around the meat fill preferably at cooking temperatures.

Two classes of container structures can be identified in the prior art which can achieve the objective of being purge-free. One class comprises flexible non-formable so-called shrink bags and casing structures into which the meat fill is directly packed. The other class of container structures involves the use of a starting formable web member which is preformed into a desired tray configuration, size, or the like before being filled with meat and sealed with a (usually non-formable) lid web member. In the first class of such container structures, it is typical to employ relatively thin (usually less than about 4 mils) walled materials. In the second class, the formable web, or tray, member typically ranges from about 8 to 14 mils in thickness while the lid web member typically ranges from about 4 to 8 mils in thickness.

The web structures employed in such second class of container structures are typically in the form of multi-layered webs or laminates wherein each layer individually serves one or more functions and wherein all layers coact together to provide a container wall structure which protects the fill from the environment in a package system and which also provides thermal stability, meat adherency and heat-shrink characteristics suitable for the firm, fill and cook operations. The interaction between the layer, is important, and, unless a suitable balance of properties exists in a given web, successful production of a cooked-in package meat product having no purge is not obtainable. Usually in the assembled package of formed container and meat fills the tray portion thereof is substantially more heat shrinkable than the lid portion; this is achieved by using selected low temperature tray forming conditions upon the starting formable web so that during forming the formable web, is, in effect, stretched and "frozen" in such configuration. Thereafter, following filling and sealing, the tray at cooking temperatures tends to shrink or "snap back" towards its starting dimensions thereby closely enveloping the meat fill as desired to avoid purge. The inner container surface portions must be suitable for food contact usage and must also be meat adherent. The formable web structure must be such as to permit tray formation, particularly under draw conditions without degradation. A good heat seal is required between contacting portions of, respectively, the tray rim portions and the lid member edge portions in order to avoid leakage, contamination, or the like even under cooking conditions. The entire container structure must be adapted for post-cooking storage of a meat fill therein at temperatures less than ambient. Package shape retention after packing and sealing and particularly during the cooking step is a particularly desirable feature associated with such second class of container structure. Because of such criteria and performance requirements, it is generally recognized in the field that it is more difficult to manufacture purge-free containers of such second class than of such first class.

There continues to exist a need for new and improved formable purge-free container structures having characteristic generally as above described, which can be produced at sufficiently low cost to make possible their production and use on a commercial scale in the cook-in meat packaging trade.

BRIEF SUMMARY OF THE INVENTION

More particularly, in one aspect, the present invention provides a new and very useful web structure for use in making meat adherent, cook-in formed container structures for meat and the like. More particularly, we have found a surprising successful structure suitable for cook-in packages for turkey and ham that provide high shrink and high seal strength during cook-in at temperatures up to about 190° F. One of such web structures is formable under relatively low temperature conditions into a tray member or the like., The other web structure of the system is not typically formable but is usable as a lid member which seals about rim portions of a formed tray member. The web structures are so made that interior surface portions of containers formed therewith are meat adherent and are heat shrinkable at cooking temperatures.

In another aspect, the present invention provides a method for producing cook-in packaged meat products without cook-out (purge) of fluids therefrom comprising the steps of:

(a) preparing a formable tray from a formable web member under generally low temperature conditions, (b) filling the tray with a meat material to be cooked, (c) sealing the tray around the peripheral portions thereof with a non-form flexible web member, (d) cooking the resulting package product whereupon the resulting container heat shrinks and intersurfaces of the container adhere to the meat product therein, whereby cook-out of fluid from the meat is substantially prevented.

A principal object of the present invention is to provide an improved container for meat cook-in which container may employ a tray portion and a lid portion, wherein both portions are meat adherable and self-adherable,, and wherein both portions experience substantial heat shrinkage at cooking temperatures, and wherein substantially no purge occurs.

Another object of this invention is to provide an improved low cost formable web structure and cooperating lid forming web structure which can be assembled, respectively, in different configurations wherein the inner surface of a container formed therefrom has a composition of non-irradiated ethylene acid copolymers.

Other and further objects, aims, purposes, features, advantages, and the like, will be apparent to those skilled in the art from teachings of the present specification taken with the accompanying drawings.

DETAILED DESCRIPTION

Figure 1:
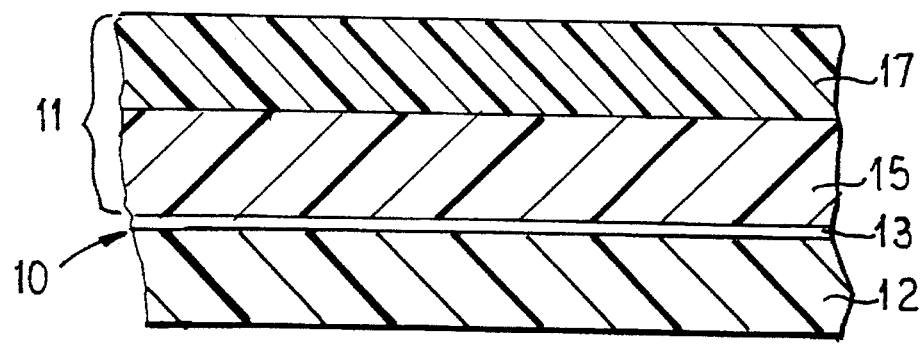
FIG. 1 presents a fragmentary enlarged vertical sectional view one embodiment of a formable web package structure of the present invention.
Figure 2:
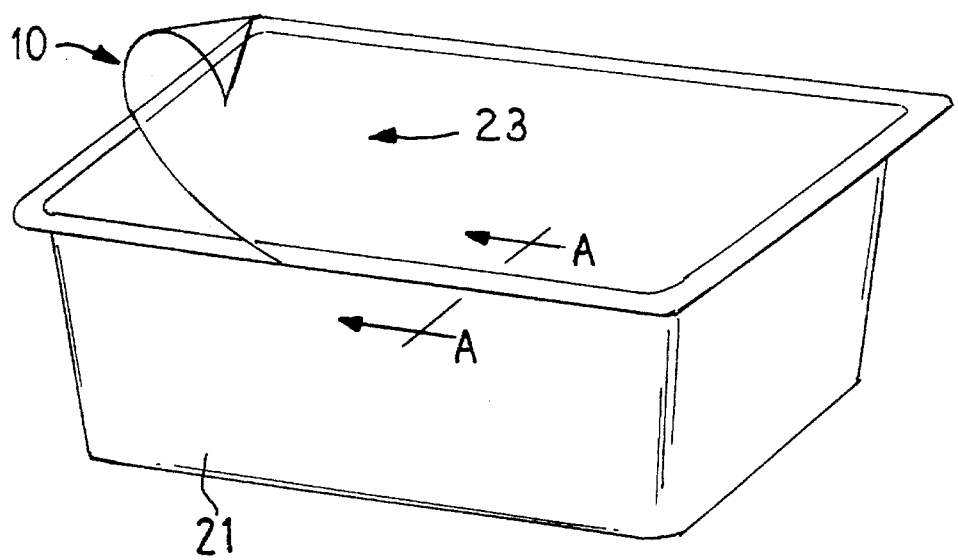
FIG. 2 is a perspective view of one embodiment of a container structure of the present invention wherein the tray portion thereof is formed from a web structure of FIG. 1.

Referring to the drawings, there is seen in FIG. 1 an enlarged, fragmentary, diagrammatic vertical sectional view of one embodiment of an interior meat adherent formable web structure of the present invention which is designated in its entirety by the numeral 10. The web structure 10 is comprised of an inner coextruded multi-layered film 11 provided with an outer or exterior layer 12 and an intermediate layer 13.

The layer 12 is comprised of a selected polyamide which is characterized by low crystallinity and a highly amorphous structure. Layer 12 has the capacity to heat shrink at a temperature in the range of from about 155° to 185° F. in each of a transverse and a longitudinal direction. Conveniently, layer 12 can range from about 1 to 6 mils although a present preference is to employ a thickness for layer 12 ranging from about 2.5 to 5 mils and most preferably about 3 mils. One suitable polyamide polymer for this purpose is a so-called nylon 666, which is available from Allied Chemical Company under the trade designation "Xtraform", Resin No. 1539. While tests of E. I. dupont DeNemours EN972 provided unpredictable results considered unsatisfactory for this purpose, tests of EN502, type 66 nylon base copolymer blend have provided good preliminary results.

The coextruded film layer 11 is comprised of integrally formed layers 15, and 17, respectively. The layer 15 is comprised of an ionomer polymer based upon a zinc salt of ethylene/(meth) acrylic acid copolymer. Such ionomer polymers are available commercially from various manufactures, for example, from the E. I. dupont and deNemours & Company under the trademark "Surlyn"/1650.

The layer 17 is comprised of an ethylene acid copolymer (EA C) such as ethylene methacrylic acid copolymers. Such polymers are available from various manufacturers. For example, from E. I. dupont under the trademark Nucrel 0902, which is similar to Nucrel 0903 except in having a Melt Index of about 1.5 rather than 2.5 dg/min. While the Nucrel 0903 has proved to have insufficiently strong seal strength during cook-in and insufficient shrink, the Nucrel 0902 with the lower melt index of about 1.5 dg/min. has proven especially satisfactory in the combination employed here.

As those skilled in the art appreciate, ethylene acid copolymers are produced by the high pressure polymerization of ethylene and acrylic or methacrylic acid in the presence of free radical initiators which results in a branched, random copolymer with carboxyl groups distributed along the chain. For purposes of the present invention, suitable ethylene acid copolymers contain from a greater than zero up to about a 6.5 weight percent acrylic acid and/or from about 0 up to about 15 weight percent of methacrylic acid and are usable in direct contact with food.. Suitable ethylene/(meth)acrylic acid copolymers are available from various manufacturers, such as, for examples, from the E. I. dupont and de Nemours and Company as its Nucrel 0902 and from the Dow Company under its trademark "Primacor."

In the film 11, the respective thicknesses of the individual layers can vary without departing from the spirit and scope of the present invention. For example, zinc ionomer polymer layer 15 can range in thickness from about 2 to 8 mils. Similarly, the thickness of layer 17 can range from about 2–8 mils with a present preference being in the range from about 2 to 6 mils and with the most preferred embodiment presently being in the range of 2 mils.

The layer 13 is comprised of an adhesive and is preferably a polyester adhesive which functions to bond the special polyamide layer 12 to the zinc ionomer layer 15. In practice, the polyester adhesive is applied as a solution or dispersion in combination with a liquid carrier to either the polyamide layer 12 or to the ionomer layer 15 after which the liquid carrier is preferably removed by evaporation to leave a layer of polyester adhesive. Thereafter, the respective layers can be brought together to form with the aid of heat and pressure the desired web structure as shown in FIG. 1. Various polyester adhesives suitable for use in the practice of the present invention are available commercially from various manufacturers. For example, one suitable polyester adhesive is available commercially under the trade designation "56065" from Whitaker Corporation.

It is a distinct feature and advantage of the present invention that the coextruded film 11 can be laminated to a nylon layer 12 or not. Film 11 can be employed so as to produce formable web structures having an inside face 17 of ethylene acid copolymer, with a Surlyn layer alone, or with Surlyn and nylon layers. layers.

The association of a coextruded film 11 with the ethylene acid copolymer and polyamide layer 12 makes possible a substantially improved heat shrinkable formable web structure which can be made to heat shrink at the typical meat cooking temperatures that fall in the range from about 155° to 200° F., and which adheres to meat product, and most particularly turkey, substantially without purge in cooking and without peripheral seal separation.

Figure 3:
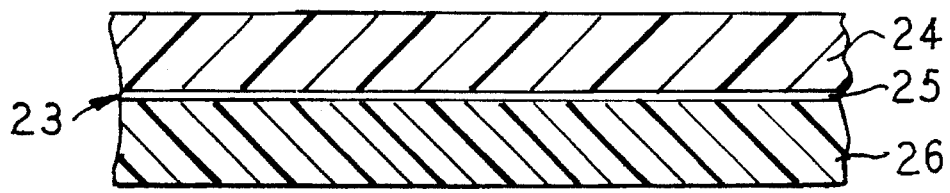
FIG. 3 is a view similar to FIG. 1 but illustrating a non-formable web structure of the present invention which is suitable for use as a lid structure in the container of FIG. 2.

The formable web structures 10 are used in combination with a non-formable web structure which is illustratively shown in FIG. 3 and which is designated in its entirety by the numeral 23.

The web structure 23 incorporates three layers, an outer layer 24, an inner layer 26, and an intermediate layer 25. The outer layer 24 is comprised of a polyamide which is similar in polymer structure and in physical properties to the polyamide comprising the above-described outer layer 12, or Surlyn as in layer 15.

The intermediate layer 25 is a polyester adhesive which is similar in function and in composition to the polyester adhesive employed in the previously described layer 13. The layer 25 may be eliminated if layers 24 and 26 are coextruded.

The inner layer 26 is comprised of an ethylene acid copolymer similar to that employed in layer 17 above described. After the tray such as tray 21 has been formed from a web structure 10 and then filled with meat, then a non-formable web structure 23 is cut and sized to fit the open top portion of the formed and filled tray 21. With the material for the layer 26 being an ethylene acid copolymer as in layer 17 a good heat seal is also achievable by a direct heat sealing between the layer 26 and the layer 17.

EMBODIMENTS

We have constructed laminate film, or carrier web, in total thickness of 8 mils with a Surlyn 1650 layer of 6 mils and a Nucrel 0902 layer of 2 mils providing a very satisfactory shrinkage and meat adherence with minimal purge and high seal strength, when combined with a lid formed of 3 mils of Nucrel 0902 with or without a backing layer of Surlyn and or nylon.

We have thus provided a satisfactory carrier web having a thickness of 11 mils, with 3 mils of nylon in combination with 6 mils of Surlyn and 2 mils of Nucrel 0902 for contact with meat product. The Surlyn and Nucrel layers have also been satisfactorily replaced with 8 mils of Nucrel.

In order for the inner layer of web structure 23 to be meat adherent, and to still provide adequate peripheral seal, we have found surprisingly, that the inner layer 26 need not be irradiated and/or corona treated when it is formed of Nucrel 0902. Similarly, the layer 17 need not be corona treated. This has been found true even though Nucrel 0903, having a higher melt index of about 2.5 has been found unsatisfactory for the cook-in at high temperatures. The examples were so manufactured and used.

The invention is clearly susceptible of being embodied with various alterations and modifications which may differ particularly from those that have been described in the preceding specification and description. For this reason, it is to be understood that all of the foregoing is intended to be merely illustrative and is not be to construed or interpreted as being restrictive or otherwise limiting of the present invention, excepting as it is set forth and defined in the hereto appended claims.

We claim as our invention:

1. A cook-in meat package comprising:

a preformed tray;

a meat product contained in the tray; and a flexible lid sealed to a rim of the tray, the meat product requiring a cooking step for consumption, each of the tray and the lid comprising a laminate that possesses high shrink and high strength during the cooking step of the meat product in the package, the laminate of each of the tray and the lid comprising an innermost surface layer that are sealed to each other around the periphery of the rim and that face the enclosed meat product, each of the innermost surface layers consists of an untreated ethylene acid copolymer having a low melt index of about 1.5 which has not been otherwise treated to enhance its adherence to the meat product during the cooking step, wherein each of the innermost surface layers adheres to the meat product and to the other innermost surface layer in the area around the meat product during the cooking step.

2. The cook-in meat package of claim 1 wherein the laminate of at least one of the tray or the lid includes a layer of ionomer.

3. The cook-in meat package of claim 1 wherein the laminates of both the tray and the lid include a layer of ionomer.

4. The cook-in meat package of claim 1 wherein the laminate of at least one of the tray or the lid includes a layer of polyamide.

5. The cook-in meat package of claim 1 wherein the laminate of at least one of the tray or the lid includes an adhesive layer.

6. The cook-in meat package of claim 1 wherein the innermost surface layer of the tray ranges in thickness from about 2 to 8 mils.

7. The cook-in meat package of claim 1 wherein the laminate possesses high shrink and high strength at temperatures ranging from approximately 155° to 200° F.

8. The cook-in meat package of claim 1 wherein the laminate possesses high shrink and high strength at temperatures up to approximately 190° F.

* * * * *